US 12,434,917 B2

(12) United States Patent
Kaeb et al.

(10) Patent No.: US 12,434,917 B2
(45) Date of Patent: Oct. 7, 2025

(54) CONTINUOUSLY FLOWING SEED METERING AND DISCHARGE SYSTEM

(71) Applicant: KSi Conveyor, Inc., Sabetha, KS (US)

(72) Inventors: Jason P. Kaeb, Sabetha, KS (US); Dominic E. Meyer, Sabetha, KS (US); Corbin Anliker, Sabetha, KS (US)

(73) Assignee: KSi Conveyor, Inc., Sabetha, KS (US)

(*) Notice: Subject to any disclaimer, the term of this patent is extended or adjusted under 35 U.S.C. 154(b) by 0 days.

(21) Appl. No.: 18/682,502

(22) PCT Filed: Sep. 26, 2022

(86) PCT No.: PCT/US2022/077007
§ 371 (c)(1),
(2) Date: Feb. 9, 2024

(87) PCT Pub. No.: WO2023/064673
PCT Pub. Date: Apr. 20, 2023

(65) Prior Publication Data
US 2024/0262637 A1 Aug. 8, 2024

Related U.S. Application Data

(60) Provisional application No. 63/262,476, filed on Oct. 13, 2021.

(51) Int. Cl.
B65G 47/19 (2006.01)
B65G 65/40 (2006.01)
G01G 11/04 (2006.01)

(52) U.S. Cl.
CPC ............ *B65G 47/19* (2013.01); *B65G 65/40* (2013.01); *G01G 11/043* (2013.01)

(58) Field of Classification Search
CPC ...... G01G 11/18; G01G 11/086; G01G 13/18; G01G 13/248; G01G 11/003; G01G 11/043; B65G 47/19; B65G 65/40
See application file for complete search history.

(56) References Cited

U.S. PATENT DOCUMENTS 3,259,199 A 7/1966 Noble et al.
4,756,348 A 7/1988 Moller
(Continued)

FOREIGN PATENT DOCUMENTS

CN 108896143 B * 11/2020 ............. G01G 13/02
DE 102014105423 A1 10/2015
(Continued)

OTHER PUBLICATIONS

Toolots Store, 10-Head Multihead Weigher Weighing Range 10-1500g, Dynamic Quantitative Packaging System, Jul. 2, 2021, 1 page, Toolots Reliable Equipment Fast, www.toolots.com.
(Continued)

*Primary Examiner* — Bob Zadeh
(74) *Attorney, Agent, or Firm* — Coughlin Law Office LLC; Stuart M. Aller; Daniel J. Coughlin

(57) ABSTRACT

A seed metering and discharge system that generates and discharges a continuous stream of seed for downstream processing. A variable position gate is disposed at an output end of a bottom hopper of the system. During a measurement period, a commanded position of the variable position gate is adjusted in proportion to mass measurement signals received from load cells mounted to the bottom hopper. A top hopper refills the bottom hopper during a refill period when the variable position gate is commanded into a fixed position. The system regulates the continuous stream of seed, measured in real-time, so that the actual seed flow rate at the output end closely matches a target seed flow rate. The system operates iteratively between the measurement and refill periods during continuous discharge cycles.

20 Claims, 9 Drawing Sheets

(56) References Cited

U.S. PATENT DOCUMENTS

| | | | |
|---|---|---|---|
| 4,867,343 A | | 9/1989 | Ricciardi et al. |
| 4,944,428 A | * | 7/1990 | Gmur .................... G01G 11/18 |
| | | | 222/77 |
| 6,365,846 B1 | * | 4/2002 | Kono .................... G01G 19/393 |
| | | | 177/25.18 |
| 6,447,674 B1 | * | 9/2002 | Simon .................. G01G 13/024 |
| | | | 222/64 |
| 6,582,516 B1 | | 6/2003 | Carlson |
| 8,393,502 B2 | | 3/2013 | Renyer et al. |
| 8,644,993 B1 | | 2/2014 | Craft et al. |
| 9,889,785 B1 | | 2/2018 | Van Horn |
| 12,000,726 B2 | | 6/2024 | Helfenstein et al. |
| 2007/0289783 A1 | | 12/2007 | Tump |
| 2012/0181093 A1 | * | 7/2012 | Fehr .................... G01G 11/086 |
| | | | 177/103 |
| 2014/0318009 A1 | | 10/2014 | Strahm et al. |
| 2016/0302352 A1 | | 10/2016 | Tramp et al. |
| 2022/0081228 A1 | * | 3/2022 | Johnson ................. A01C 7/081 |
| 2024/0262637 A1 | * | 8/2024 | Kaeb ....................... B65G 47/19 |

FOREIGN PATENT DOCUMENTS

| | | | | |
|---|---|---|---|---|
| KR | 100773067 B1 | * | 11/2007 | ........... B28C 7/0422 |
| WO | 2020212868 A1 | | 10/2020 | |
| WO | 2023081712 A1 | | 5/2023 | |

OTHER PUBLICATIONS

Precia Molen NA, Hopper scale ABS-X Ex, Bulk Discontinuous Weighing: Automatic Bulk Scales, Aug. 15, 2022, 2 pages, Precia Molen Worldwide Weighing, North America, https://us.preciamolen.com.

AGCO, Material Handling Solutions, Bulk Weighers, Mar. 2016, 12 pages, IS-107, GSI, www.grainsystems.com.

Aaron, DocuSign Envelope, Aug. 19, 2021, 4 pages, Change Level 03, KSi, Sabetha, Kansas, USA.

Brabender Technologie Gmbh & Co. KG, Dosing differential balance for liquid dosing, DE102014105423A1, Oct. 22, 2015, 6 pages, Google Patents—machine translation, https://patents.google.com/patent/DE102014105423A1/en.

Weigh Right, Model iQ-1E, Self Adjusting Entry Level Scale, Jul. 2, 2021, 2 pages, Weigh Right Automatic Scale Co., www.weighright.com.

ECNNET CO. LTD, et al., The blending method and the apparatus for auto-controlling ratio of size of recycling aggregate, KR100773067B1, Nov. 2, 2007, 9 pages, Google Patents—machine translation, https://patents.google.com/patent/KR100773067B1/en.

KSI, KSi AutoTreat V4.2 System User's Manual, KSi Automation, Sep. 9, 2015, 84 pages, vol. 1, KSi Conveyors, Inc., Sabetha, KS.

Precia Molen NA, ABS-X Ex Hopper Scale, Bulk Dry Granular Product Weighing, Jun. 21, 2022, 2 pages, Precia Molen Worldwide Weighing, North America, www.preciamolen.com.

Paul A. Kaeb, Public Sale Disclosure Statement, Sep. 2, 2021, 1 page, KSi Conveyor, Inc., Sabetha, KS.

Aaron Zientara, SC 03 Quote, DocuSign Envelope, Aug. 19, 2021, 2 pages, KSi Conveyors Inc, Sabetha, KS.

Flexicon, Weigh Batching Systems, Bulk Handling Equipment and Systems, Jul. 2, 2021, 3 pages, Flexicon Corporation, https://www.flexicon.com/Bulk-Handling-Equipment-and-Systems/Weigh-Batching-Systems/.

* cited by examiner

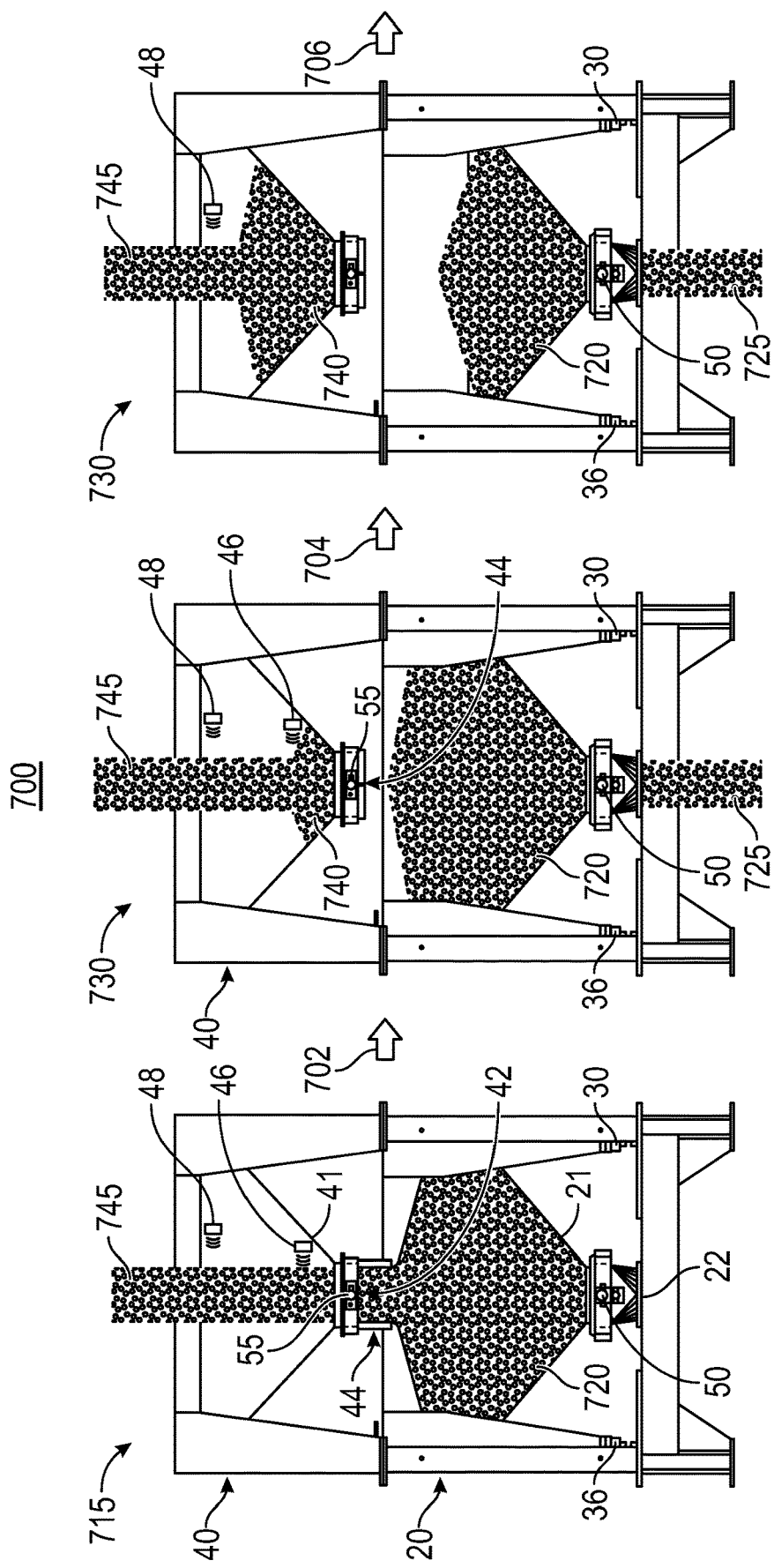

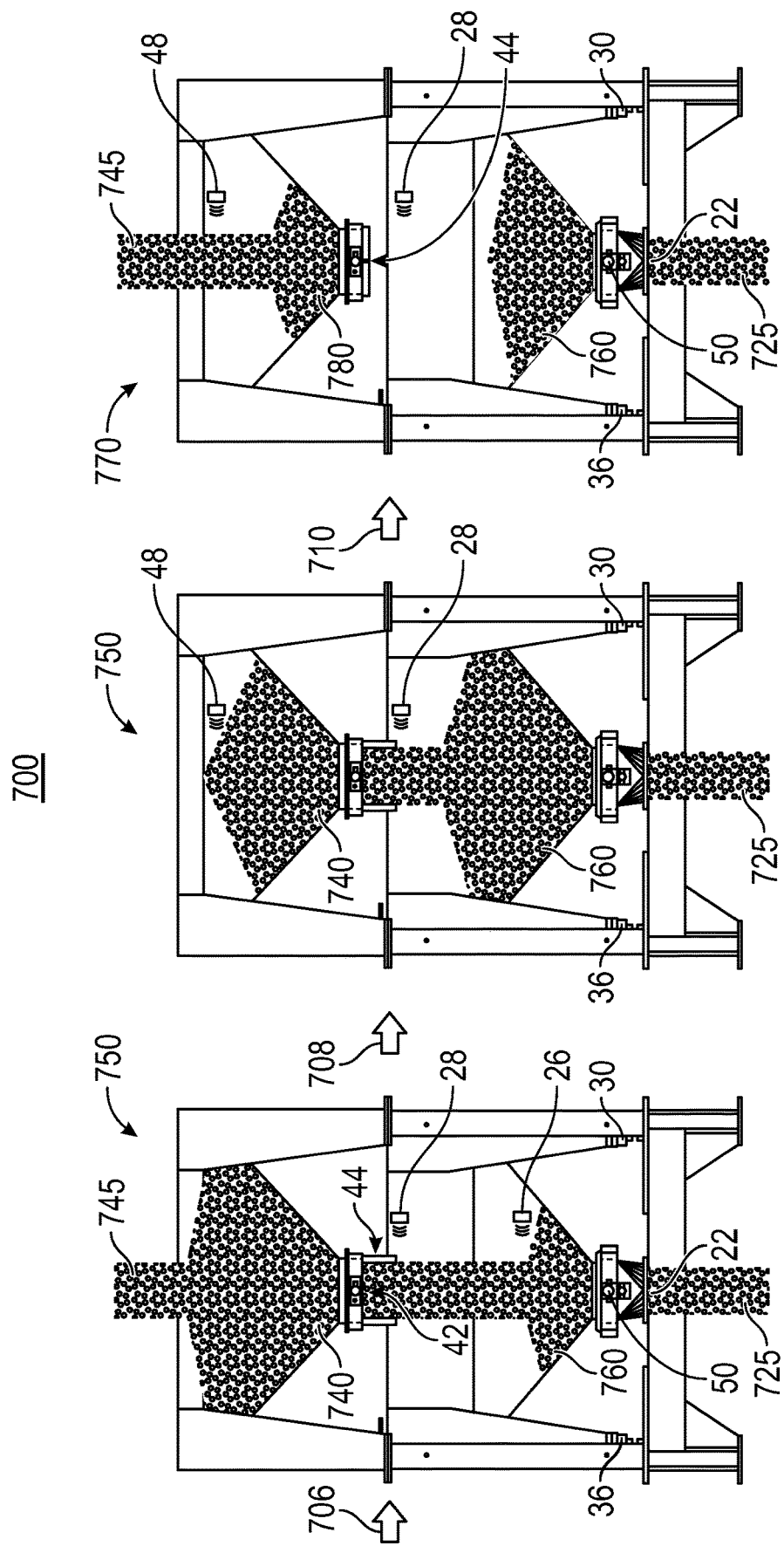

CONTINUOUSLY FLOWING SEED METERING AND DISCHARGE SYSTEM

CROSS REFERENCES

This application claims priority of U.S. Provisional Application No. 63/262,476 filed 13 Oct. 2021.

REFERENCE TO RESEARCH

Not Applicable.

REFERENCE TO CDS

Not Applicable.

TECHNICAL FIELD

The present disclosure is directed to the control, metering, and continuous discharge of large volumes of materials in bulk form, such as crop seeds, from a hopper arrangement that is operable to switch a variable gate position in effectuating a gravimetric discharge and a static discharge.

BACKGROUND

Bulk materials, such as crop seeds, are typically stored in elevated hoppers from which the material is discharged for distribution or use. Seed may be discharged manually or automatically on a time or weight basis. A variety of gates are used to control the flow of seed from the hopper, such as drop gates, seed wheels, and adjustable slide gates. Discharged seed may undergo applications of various nutrients, inoculants, fungicides, and pesticides prior to planting. Seed treatments are applied to increase the size, health, and value of the crop produced by the seeds.

SUMMARY

We disclose a seed metering and discharge system capable of dispensing a continuous stream of seed. The continuous stream of seed is delivered at an actual seed flow rate that is useful for downstream processing. To accomplish this, the system has a hopper arrangement that regulates a stream of seed to meet a target seed flow rate. The system may or may not be under the control of a controller. A user may enter the target seed flow rate into the controller of the seed metering and discharge system. The stream of seed may be intermittently or continuously dispensed at an input end of the seed metering and discharge system. The stream of seed that meets the target seed flow rate is continuously delivered at an output end of the seed metering and discharge system. A controller regulates the stream of seed continuously delivered at the output end of the seed metering and discharge system. The output end of the seed metering and discharge system may have pivoting, turning, or sliding gate(s) that are electrically, pneumatically, or hydraulically actuated to open or close discharge openings of the hopper arrangement during a continuous discharge cycle. The continuous discharge cycle includes refill and measurement periods performed iteratively.

The seed metering and discharge system is capable of accurately delivering the stream of seed at a target seed flow rate, regardless of seed size, to provide a loss-in-weight seed flow control solution. An advantage to the seed metering and discharge system may be an increase in throughput capacity and flow control with periodic continual gate adjustment based on scale readings during the measurement periods. Another advantage to the seed metering and discharge system may be the capability to meter seed in a periodic continuous manner by switching between a longer measurement period, where seed is metered gravimetrically (also referred to as loss-in-weight), and a shorter refill period, where seed is discharged at a constant rate. Another advantage to the system's stacked hopper arrangement may be a reduction in the amount of floor space needed for installation within the facility and the amount of load cells needed for the metering and discharge process. Also, other industrial and commercial uses of the system may be realized by market sectors in food processing, dry powder transfer, pet food processing, mills, and continuous batch grinders. An advantage with continuous treatment of seed in proportion to an automatically determined metered rate of seed is the reduction or elimination of regular operator-implemented calibration parameter adjustments.

BRIEF DESCRIPTION OF DRAWINGS

Aspects are illustrated by way of example, and not by way of limitation, in the accompanying drawings, wherein:

FIG. 7A shows a loading period in a series of chronological depictions of the seed metering and discharge system where an input flow of bulk material is discharged from the supply hopper to the weigh hopper during a continuous discharge cycle.

FIG. 7B shows a first measurement period in a series of chronological depictions of the seed metering and discharge system operating under a variable position mode during the continuous discharge cycle.

FIG. 7C shows the first measurement period in a series of chronological depictions of the seed metering and discharge system operating under the variable position mode during the continuous discharge cycle.

FIG. 7D shows a first refill period in a series of chronological depictions of the seed metering and discharge system operating under a fixed position mode during the continuous discharge cycle.

FIG. 7E shows the first refill period in a series of chronological depictions of the seed metering and discharge system operating under the fixed position mode without the input flow of bulk material into the supply hopper during the continuous discharge cycle.

FIG. 7F shows a second measurement period in a series of chronological depictions of the seed metering and discharge system operating under a variable position mode during the continuous discharge cycle.

DETAILED DESCRIPTION

Figure 1:
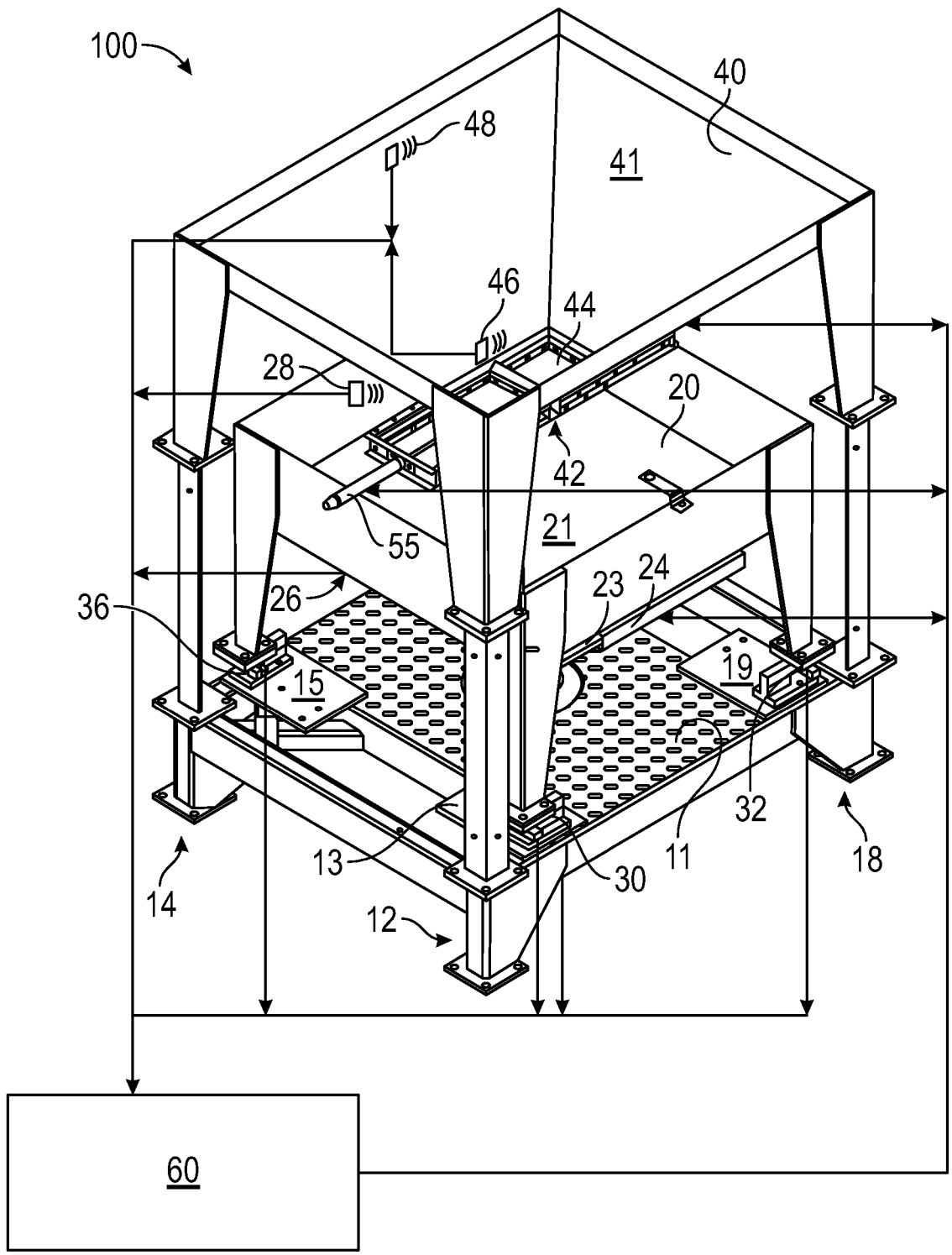
FIG. 1 shows a perspective view of a seed metering and discharge system hardwired to a controller.

A seed metering and discharge system—system 100—delivers a continuous stream of a dry granular free-flowing product at an actual seed flow rate that matches a target seed flow rate. The system 100 may be used with virtually any type of bulk material (i.e., a large mass, or volume, of particulate material). Therefore, the system 100 may dispense agricultural products such as agricultural seed, including corn, soybeans, wheat, rice, etc. The system 100 provides a continuous flow system for metering and discharging a delivered seed amount from a dispensed seed amount. The system 100 may have at least two mechanical sub-assemblies, which may be hoppers. The hoppers may be a weigh hopper 20 and a supply hopper 40 made from coated or stainless-steel sheets or metallic framework. The weigh hopper 20 and the supply hopper 40 may include a lower tapered portion, a first tapered portion 21 and a second tapered portion 41, respectively, for directing a quantity of the bulk material. The system 100 is operable to intermittently dispense a seed amount from the supply hopper 40 to the weigh hopper 20, while the weigh hopper 20 continuously delivers a specified quantity of seed for downstream processing. Agricultural seed in an ordered seed amount of between 1,000 pounds (lbs.) to 50,000 lbs. (approximately 454 kilograms (kg) to 22,680 kg) may flow through the system 100 at a substantially constant rate during a continuous discharge cycle. Agricultural seed in amounts greater than 50,000 lbs. (approx. 22,680 kg) may flow through the system 100 at a substantially constant rate during an extended continuous discharge cycle or throughout an extended interval that includes multiple continuous discharge cycles performed consecutively. The supply hopper 40 and the weigh hopper 20 may or may not be bolted to a frame assembly and/or rack to support the added weight of the agricultural seed.

The weigh hopper 20 may be disposed below the supply hopper 40. The weigh hopper 20 performs as a measurement hopper when the seed amount is discharged gravimetrically. The weigh hopper 20 includes a first tapered portion 21. The first tapered portion 21 may be sufficiently steep and smooth to reduce friction on the seed amount passing through the weigh hopper 20. In the case of using round hoppers, less friction may reduce instances where seed flow forms a central flow path (funnel flow) within the weigh hopper while non-flowing seed is left along the inside margins within the hopper. The weigh hopper 20 has a first discharge opening 22 (shown in FIG. 5). A variable position gate 24 is mounted against the first discharge opening 22 of the weigh hopper 20. The weigh hopper may be configured to support up to 10,000 lbs. (approx. 4,540 kg), or more, of weight. In the example shown, the weigh hopper is configured to support approximately between 1,500 lbs. to 2,000 lbs. (approx. 680 kg to 907 kg) of weight. The weigh hopper 20 may have a first low-level sensor 26 and a first high-level sensor 28 mounted thereto.

Figure 2:
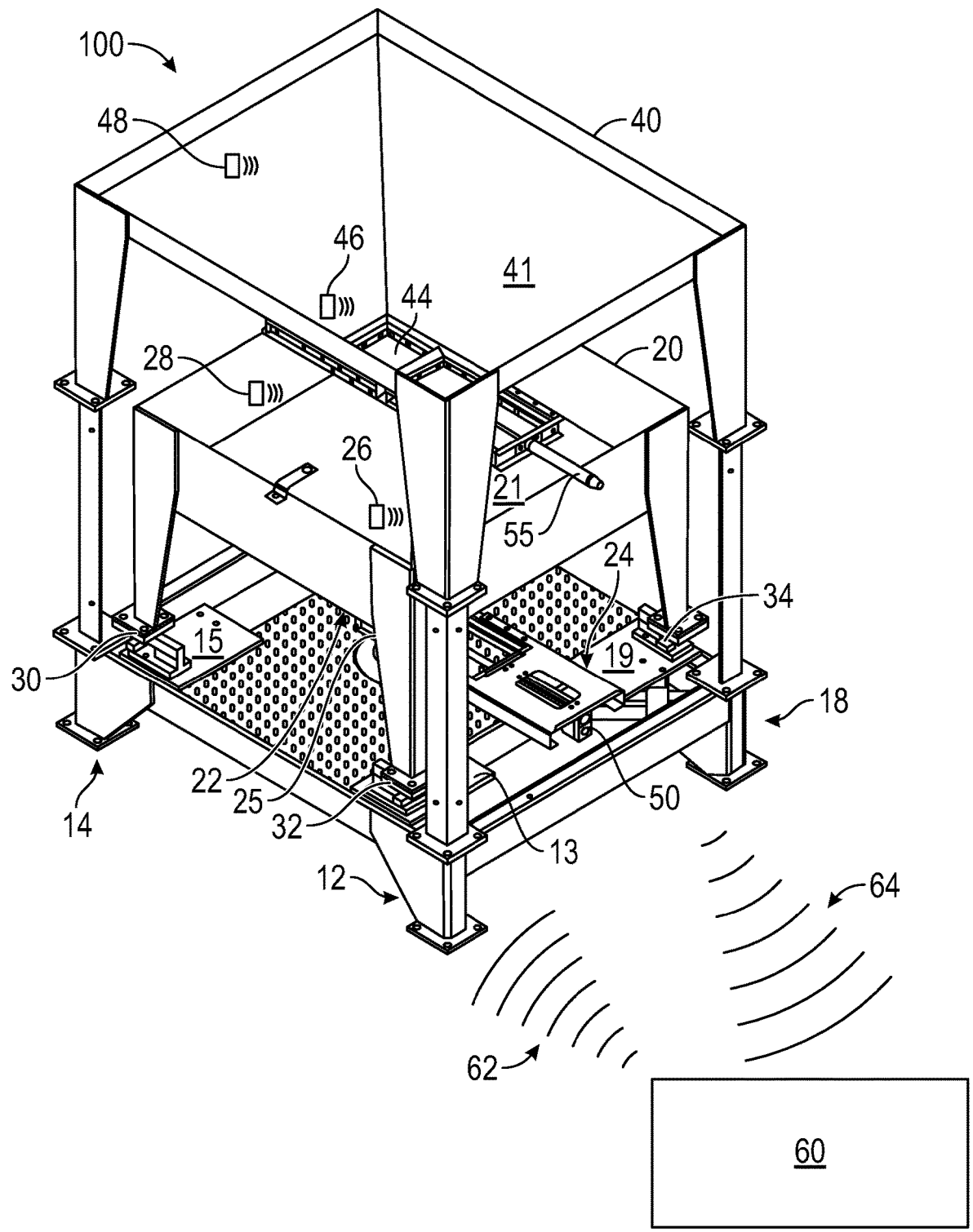
FIG. 2 shows a perspective view of a seed metering and discharge system in wireless communication with a controller.
Figure 5:
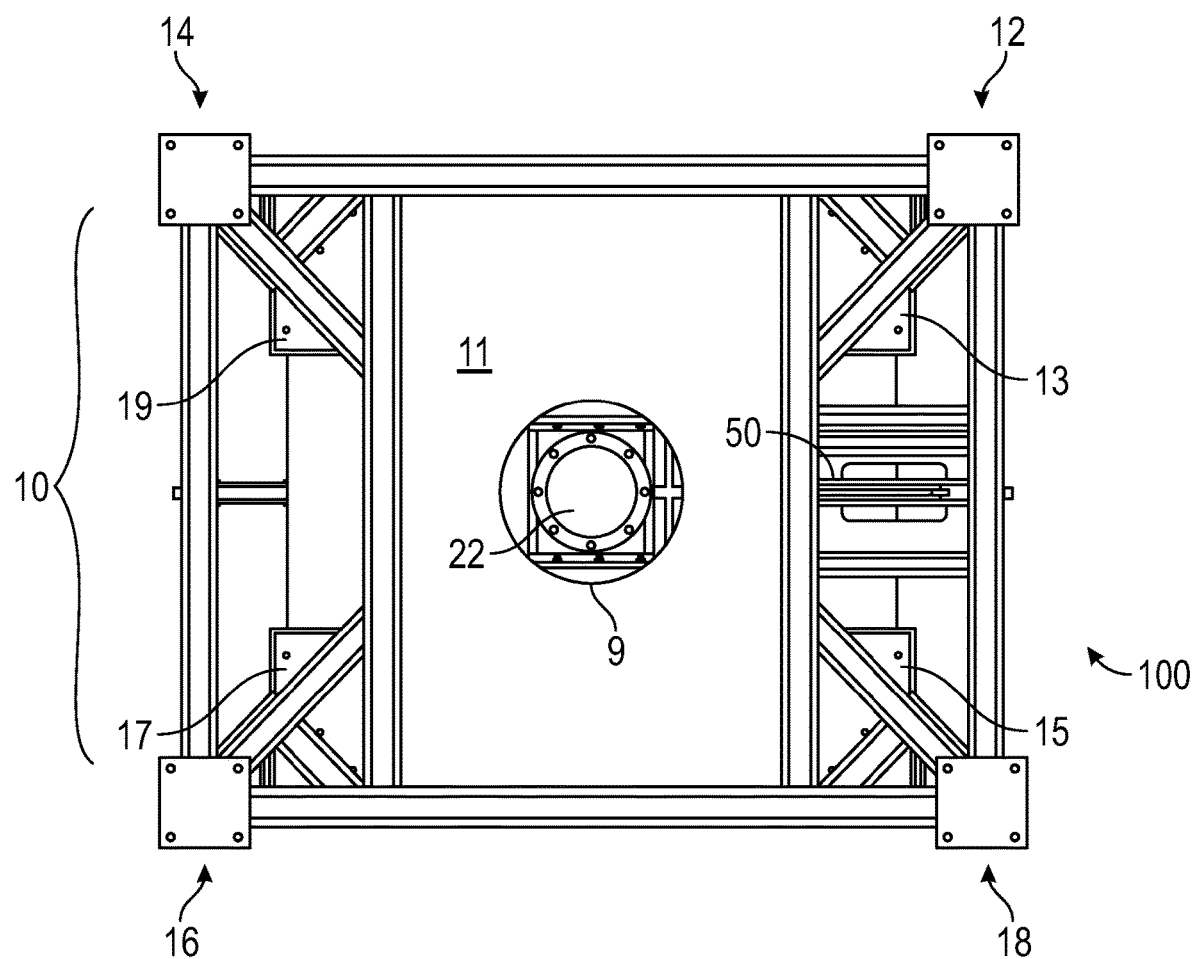
FIG. 5 shows a bottom view of a seed metering and discharge system.

The first low-level sensor 26 and the first high-level sensor 28 may be proximity sensors for detecting when agricultural seed is adjacently present within the weigh hopper 20. Alternatively, other types of sensors or detectors may be used, such as touch, ultrasonic, optical, or pressure types. The low- and high-level sensors may provide an electronic signal to a controller 60 of the system 100. The connection between the sensors and the controller 60 may be hardwired or wireless. The low level for placement of the first low-level sensor 26 may be down to a position that correlates with 1% of the hopper's holding capacity or volume as shown in FIG. 2 and FIG. 5. The high level for placement of the first high-level sensor 28 may be up to a position that correlates with 99% of the hopper's holding capacity or volume as shown in FIG. 2 and FIG. 5. As a safety measure, the first high-level sensor 28 may also serve in preventing an overflow of a quantity of agricultural seed beyond the holding capacity or volume of the hopper. Alternatively, a continuous-level sensor may be installed along an interior, vertical surface of the weigh hopper 20. The weigh hopper 20 is also supported directly with a plurality of load cells placed upon load cell platforms disposed above generally vertical support members.

The variable position gate 24 mounted upon the first discharge opening 22 is best shown in FIG. 2. The variable position gate 24 is proportionally adjusted on a periodic continuous basis. The variable position gate 24 may be precisely positioned by means of a continuous position feedback electric actuator, which provides gate position accuracy of +/−1%. The variable position gate 24 can be repeatedly repositioned to the same position within +/−0.01 inch. The variable position gate 24 is adjusted in proportion to a loss-in-weight reading of the weigh hopper 20 in real-time. The variable position gate 24 adjusts the seed flow passing through the first discharge opening 22 to match a target seed flow rate initially set by the user.

At least a first load cell 30 is mounted to the weigh hopper 20. The first load cell 30 may be mounted at a lower end of a first leg or support stand of the weigh hopper 20. The weight of the weigh hopper 20 and a quantity of seed within, pushes against the first load cell 30 by the force of gravity. Alternatively, the first load cell 30 may be mounted above a top side of the weigh hopper. In this case, the weight of the weigh hopper 20 and a quantity of seed within, pulls against the first load cell 30 by the force of gravity. One or more load cells 30, 32, 34, 36 may be used depending on the shape of the hoppers, whether round, triangular, square, or rectangular.

Figure 4:
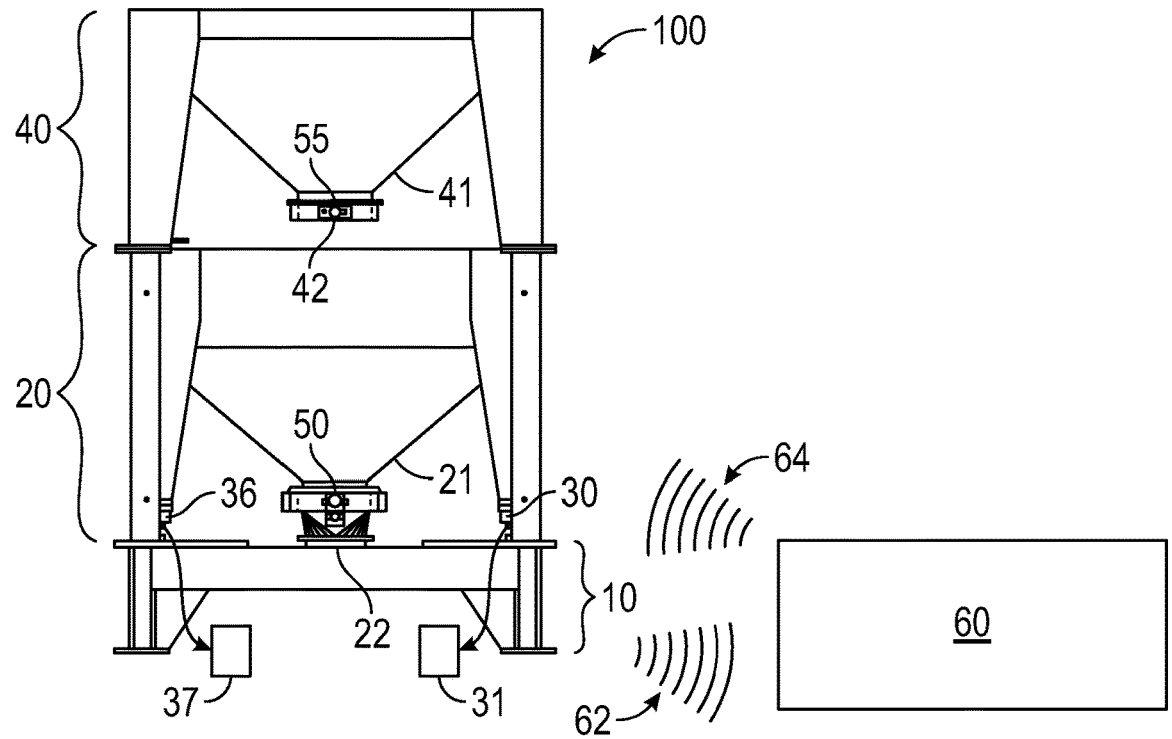
FIG. 4 shows a side view of the seed metering and discharge system of FIG. 2.

The load cells 30, 32, 34, 36 may be selected from several common types such as electronic, strain gauge, hydraulic, electropneumatic, or hydraulic pneumatic. Readings by the load cells 30, 32, 34, 36 may be given in English (or metric) increments of one pound (approx. 0.5 kg), 2 lbs. (approx. 1 kg), 5 lbs. (approx. 2.5 kg), 10 lbs. (approx. 5 kg), 20 lbs. (approx. 10 kg), 100 lbs. (approx. 50 kg), depending on the quality of adjustment for operation and calibration of the system 100. Each of the load cells 30, 32, 34, 36 may have a capacity to read up to 2,500 lbs. (approx. 1,134 kg), or more, of weight. In that case, a total capacity of up to 10,000 lbs. (approx. 4,540 kg) of weight may be read by four load cells used in combination. Each of the load cells 30, 32, 34, 36 may be electrically or wirelessly connected to a load scale. Alternatively, each of the load cells 30, 32, 34, 36 may be electrically connected or transmit a wireless data input signal 62 directly to the controller 60 via a transmitter. Each of the load scales 31, 37 may further measure the rate of weight change of an associated hopper. The load scales 31, 37 may have network connection with the system 100. As shown in FIG. 4, the load scales 31, 37 may provide a data input signal 62 to the controller 60. The load scales 31, 37 may provide a loss-in-weight reading of the weigh hopper 20 to the controller 60 as the quantity of seed within the weigh hopper 20 changes. Alternatively, a legal for trade scale might be used with the hopper's load cells or a beam scale.

As shown in FIG. 1 and FIG. 2, the lower end of each of the legs supporting the weigh hopper 20 may be disposed upon and supported by a first, second, third, and fourth load cell 30, 32, 34, 36. Each of the load cells 30, 32, 34, 36 may be disposed on a load cell platform 13, 15, 17, 19. The load cell platforms 13, 15, 17, 19 may be disposed upon and supported by a lower sub-frame 10 which also provides support for the weigh hopper 20 and/or the supply hopper 40. The lower sub-frame 10 disposed below each of the hoppers may be mounted to and supported by a plurality of support members which may include generally vertical support members 12, 14, 16, 18. Alternatively, the hoppers may be positioned directly on and supported by the plurality of support members which includes the generally vertical support members 12, 14, 16, 18. The vertical support members 12, 14, 16, 18 may be connected to the support rack or supportive framework of the lower sub-frame 10. Alternatively, each of the hoppers may be supported vertically, from above, by a plurality of support members such as chains or rods.

As shown in FIGS. 1-4, the supply hopper 40 may be disposed above the weigh hopper 20. The four support legs of the supply hopper 40 are each disposed upon vertical support members 12, 14, 16, 18. The vertical support members may be connected to the foundation of the lower sub-frame 10. The system 100 provides the capability of filling the supply hopper 40 with seed to a designated, or predetermined, target weight. The supply hopper 40 performs as a surge hopper when the weigh hopper 20 is running low on a quantity of product. The supply hopper 40 includes a second tapered portion 41. The second tapered portion 41 may be sufficiently steep and smooth to reduce friction on the seed amount passing through the supply hopper 40. The supply hopper 40 has a second discharge opening 42. A binary gate 44 may be mounted against the second discharge opening 42. The holding capacity of the supply hopper 40 may equal that of the weigh hopper 20. Alternatively, the holding capacity of the supply hopper 40 may be greater than or less than that of the weigh hopper 20. The supply hopper 40 may have a second low-level sensor 46 and a second high-level sensor 48. The low level for placement of the second low-level sensor 46 may be down to a position that correlates with 1% of the hopper's holding capacity. The second high-level sensor 48 may be up to a position that correlates with 99% of the hopper's holding capacity. The second high-level sensor 48 may also serve as a safety measure to prevent an overflow of a quantity of agricultural seed exceeding the holding capacity or volume of the hopper. Alternatively, a continuous-level sensor may be installed along an interior, vertical surface of the supply hopper 40. The supply hopper 40 may or may not be necessarily supported with a load cell.

Figure 3:
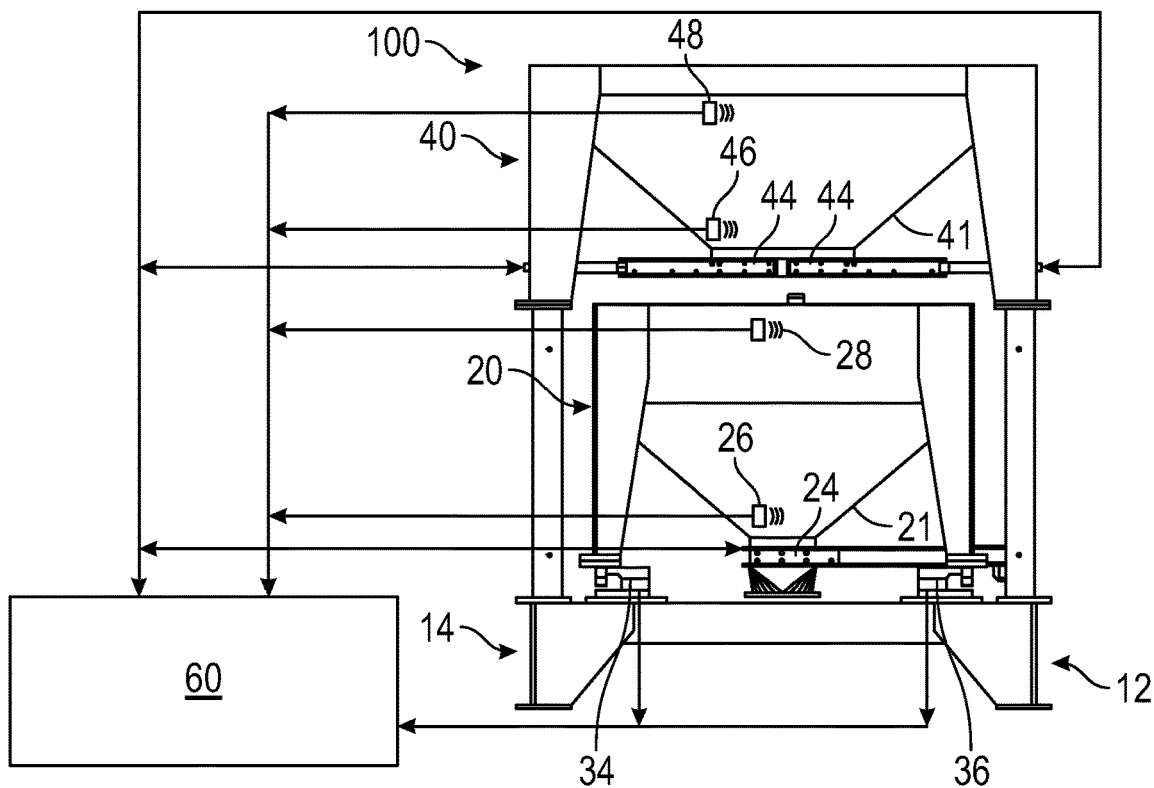
FIG. 3 shows a side view of the seed metering and discharge system of FIG. 1 with low- and high-level sensors mounted to the supply hopper and the weigh hopper.

As shown in FIGS. 1-3, the binary gate 44 may be mounted upon the second discharge opening 42 of the supply hopper 40. The dual gates of the binary gate 44 may be opened by means of air-assisted cylinders. The binary gate 44 may be opened quickly on a periodic basis for faster refills of the weigh hopper.

The system 100 further includes first and second control mechanisms 50 and 55, respectively. The opening and closing of the hopper gates mounted upon the first and second discharge openings 22, 42, respectively, may be controlled by the first and second control mechanisms 50, 55, respectively, when activated. The first and second control mechanisms 50, 55, may be electrically, mechanically, hydraulically, or pneumatically powered. Gate operation may be actuated by devices such as cylinders, servomechanisms, or worm screws. As shown in the figures, pneumatic air-assist cylinders and electric actuators having position control may operate the hopper gates, a binary gate 44 and a variable position gate 24, respectively. Control of the binary gate 44 and the variable position gate 24 may be provided by means other than pneumatic cylinders or electric actuators. The use of the chosen means is preferred because of the rapid or precise control of the different hopper gates used. First and second control mechanisms 50, 55 may be coupled to the controller 60 and receive various control inputs from the controller 60.

As shown in FIG. 2, the first control mechanism 50 may be operably connected to electric power. The first control mechanism 50 may precisely control the open/close positions of the variable position gate 24 into commanded positions. A continuous stream of seed may be continuously delivered through the first discharge opening 22 of the weigh hopper 20. As seed discharges from the weigh hopper 20, the first control mechanism 50 may command adjustment of the variable position gate 24 in proportion to a measured seed flow rate based on response to signals received from the load cells of the weigh hopper 20. Commands to the position of the variable position gate 24 may occur in real-time with the loss-in-weight calculation based on signals received from the load cells of the weigh hopper 20. An electric power source may be coupled to the first control mechanism 50 to provide for precise and accurate control of the variable position gate 24, although the electric power source is not shown in the figures for simplicity.

As shown in FIG. 1 and FIG. 2, the second control mechanism 55 is operably connected to the binary gate 44. A pneumatic pressure source is coupled to the second control mechanism 55 to provide for simultaneous, independent control of each of the gates of the binary gate 44, although the pneumatic pressure source is not shown in the figures for simplicity. The second control mechanism 55 provides regulated air to first and second pneumatic air-assist cylinders for quickly and accurately controlling the position of the binary gate 44 connected thereto. The second control mechanism 55 may quickly open and close the binary gate 44 based on commands received from the controller 60.

Referring now to FIG. 1 and FIG. 3, a combined schematic and block diagram of the system 100 is shown. As described above, the system 100 includes the weigh hopper 20 and the supply hopper 40. Respectively coupled to the weigh hopper 20 and the supply hopper 40 are the variable position gate 24 and the first control mechanism 50 and the binary gate 44 and second control mechanism 55. Also, as described above, the plurality of load cells may be attached to lower portions of each of the legs of the weigh hopper 20. The system 100 may be hardwired to a built-in programmable automation controller shown as controller 60 in FIG. 1. Controller 60 may include programming for interfacing with the load cells, scales, level sensors, and control mechanisms for monitoring and controlling the flow of seed from the various hoppers. The controller 60 may be operable to linearly slide the variable position gate 24 into a commanded position via electric actuation during a measurement period.

Referring now to FIG. 2, one version of an arrangement of the system 100 is shown in perspective view. As shown, a controller 60 that is wireless may be operably connected to the system 100. Either controller 60, hardwired (i.e., ethernet, data communications protocol, serial communication link) or wireless (i.e. Wi-Fi, Bluetooth, mobile, wireless networking) may give an operator mastery over the system 100. The controller 60 may have a touch screen to allow operator command. Various data input signals 62 are sent to the controller 60 from the plurality of load cells 30, 32, 34, 36 and various command output signals 64 are sent from the controller 60 based on the data received. As previously discussed, the load cells 30, 32, 34, 36 of the weigh hopper 20 may be coupled to the controller 60 by a plurality of cables in the case of a hardwired system as shown in FIGS. 1 & 3.

The controller 60 may be an automated controller such as a computer serving as a programmable logic controller (PLC) that automatically controls the system 100 functions. The controller 60 may be operably connected to the first and second control mechanisms 50, 55, the load cells 30, 32, 34, 36, the first and second low-level sensors 26, 46 and the first and second high-level sensors 28, 48. The controller 60 may receive multiple mass measurement input signals from the load cells 30, 32, 34, 36, low-level measurement input signals from the first and second low-level sensors 26, 46 and high-level measurement input signals from the first and second high-level sensors 28, 48. The controller 60 may be programmed to send command output signals 64 to activate and operate the first and second control mechanisms 50, 55. The controller 60 is also responsive to position feedback input signals received from the first and second control mechanisms 50, 55. A transmitter operably connected to the first and second control mechanisms 50, 55 may transmit the position feedback input signals to the controller 60.

The controller 60 may be configured with a loss-in-weight rate setting and a fixed-rate setting that operates the system 100 in a variable position mode and a fixed position mode, respectively. Loss-in-weight measurement signals may be received by the controller 60 when a respective low- or high-weight set point is reached. The controller 60 may be configured to switch operation of the system 100 between the variable position mode and the fixed position mode in real-time.

The loss-in-weight rate setting may be engaged when at least the first load cell 30 of the weigh hopper 20 correlates to a high-weight set point. Alternatively, the controller 60 may activate the first control mechanism 50 to proportionally adjust the variable position gate 24 when the first high-level sensor 28 of the weigh hopper 20 generates a first high-level signal. The controller 60 is engaged in the loss-in-weight rate setting when the weigh hopper 20 is not receiving a seed amount from the supply hopper 40. The supply hopper 40 may or may not be receiving seed from the transfer equipment at this time. In the variable position mode, the variable position gate 24 may be precisely and proportionally adjusted while the binary gate 44 is closed. The rate of change provided in a loss-in-weight value obtained from the weigh hopper 20 may be used by the controller 60 to adjust the position of the variable position gate 24. The variable position mode allows for variable and regulated discharge of seed through the weigh hopper 20 during a measurement period.

The fixed-rate setting may be engaged when at least the first load cell 30 of the weigh hopper 20 correlates to a low-weight set point. The controller 60 is engaged in the fixed-rate setting when the weigh hopper 20 is receiving the seed amount from the supply hopper 40. The supply hopper 40 may or may not be receiving seed from the transfer equipment at this time. In the fixed position mode, the variable position gate 24 may be held or locked in a fixed position while the binary gate 44 is open. Alternatively, the controller 60 may activate the first control mechanism 50 to statically position the variable position gate 24 when the first low-level sensor 26 of the weigh hopper 20 generates a first low-level signal. The fixed position of the variable position gate 24 may be based on a previous position from the measurement period, load cell readings taken, or a previously inputted or selected pounds per minute (lbs./min) rate. Alternatively, the fixed position of the variable position gate 24 may be based on a relationship between gate positions averaged over time and a target seed flow rate. The fixed position mode allows for continuous and regulated discharge of seed from the weigh hopper 20 during a refill period.

The system operates during a continuous discharge cycle. The continuous discharge cycle includes refill and measurement periods. The continuous discharge cycle may start at commencement of filling an ordered seed amount or initiating an extended production run. The continuous discharge cycle may stop when the ordered seed amount has been fulfilled or the production run has been halted. Control parameters such as the input/output flows of agricultural seed and the target seed flow rate may be adjusted during the continuous discharge cycle. During the continuous discharge cycle, the actual seed flow rate—a delivered seed flow rate—may automatically adjust based on the controller 60 switching the system 100 between the variable position mode, where a measured seed flow rate (based on a loss-in-weight calculation) is performed, and the fixed position mode, where an assumed seed flow rate (based on a measured seed flow rate associated with the variable gate position during the previous variable position mode operation) is performed. The system 100 transitions into the measurement period of the continuous discharge cycle when the controller 60 places the system 100 into the variable position mode. The system 100 transitions into the refill period of the continuous discharge cycle when the controller 60 places the system 100 into the fixed position mode. A time interval for the measurement period may be greater than a time interval for the refill period.

The controller 60 transitions into a measurement period when the seed amount within the weigh hopper 20 is nearing the hopper's full capacity. During the measurement period, the supply hopper is not discharging a quantity of seed into the weigh hopper 20. The supply hopper 40 may not refill the weigh hopper 20 with a quantity of seed during the measurement period because real-time gravimetric metering of seed is occurring. During the measurement period, a continuous and variable seed flow stream is metered from the weigh hopper 20 to match the target seed flow rate. An intermittent or continuous stream of seed may be refilling the supply hopper 40 at the same time the continuous and variable stream of seed is discharged from the weigh hopper 20. The variable position gate 24 is commanded into variable positions during the measurement period. The variable position of the variable position gate 24 may be based on real-time readings received from the load cells 30, 32, 34, 36 by the controller 60. Metered seed flow rates of the seed amount occur gravimetrically through the first discharge opening 22 until the controller 60 switches the system 100 into the fixed position mode. In the fixed position mode, the controller 60 opens the binary gate 44 of the supply hopper 40 and transitions the variable position gate 24 into a fixed position.

The system 100 transitions into a refill period when the seed amount within the weigh hopper 20 is nearing empty or is completely empty at the start of an initial loading period. The supply hopper 40 may quickly refill the weigh hopper 20 with a quantity of seed during the refill period. For example, the rate of refill by the supply hopper 40 may be 7,000 lbs./min (approx. 3,175 kg/min). At this rate, a weigh hopper 20 having a holding capacity of 1,700 lbs. (approx. 771 kg) may substantially refill within ten seconds. Not all contents of the supply hopper 40 necessarily must be dumped at each refill period. During the refill period, a consistent seed flow stream is discharged from the weigh hopper 20 unless the loading period is occurring. A continuous stream of seed may be refilling the supply hopper 40 at the same time a continuous stream of seed is discharged from the weigh hopper 20. If the binary gate 44 is open, the variable position gate 24 is locked into a fixed position during the refill period. The binary gate 44 may be closed and the refill period halted by the controller 60 upon receipt of a filled signal that a filled set point has been met.

The fixed position of the variable position gate 24 may be based on a previously calculated average between previous variable gate positions and previous measured seed flow rates obtained during the measurement period. Alternatively, the fixed position may be based on real-time measurements collected during an interval of time, such as a few seconds up to several hours, from one or more previous measurement periods. Measured seed flow rates through the first discharge opening 22 during measurement periods may be averaged to calibrate and regulate the fixed position mode. The fixed position of the variable position gate 24, based on calibration parameters automatically adjusted and set during the measurement period, allows passage of seed through the first discharge opening 22 of the weigh hopper 20 at an assumed seed flow rate that is constant and substantially matches the target seed flow rate. For example, the assumed seed flow rate may substantially match a target seed flow rate of 1,000 lbs./min (approx. 454 kg).

A gain-in-weight reading of the weigh hopper 20 may be measured during the refill period. This measurement may not accurately reflect the total amount of seed which is being added to the weigh hopper 20, as the continuous stream of seed is being discharged from the weigh hopper 20. Even if not accurate as a legal for trade amount, it may be helpful for calculating an approximate total seed amount when calculated based on the refill time and the assumed seed flow rate during the refill period.

Once the binary gate 44 of the supply hopper 40 is closed, the system 100 transitions back to proportional adjustment of the variable position gate 24 based on real-time weight measurements of the weigh hopper 20.

Referring now to FIG. 5, a bottom view of the system 100 as described above is shown. The first discharge opening 22 of the weigh hopper 20 may be seen through the lower discharge housing 9 of the platform 11. A quantity of agricultural seed may continuously flow through the first discharge opening 22 when the variable position gate 24 is opened. The quantity of agricultural seed then flows through the lower discharge housing 9 of the platform 11 for collection or further processing. Further processing may include accurately treating an ordered seed amount based on correlating the discharge rate of the seed through the system 100 with the treatment rate for a seed treatment apparatus downstream of the system 100 as discussed further below.

Figure 6:
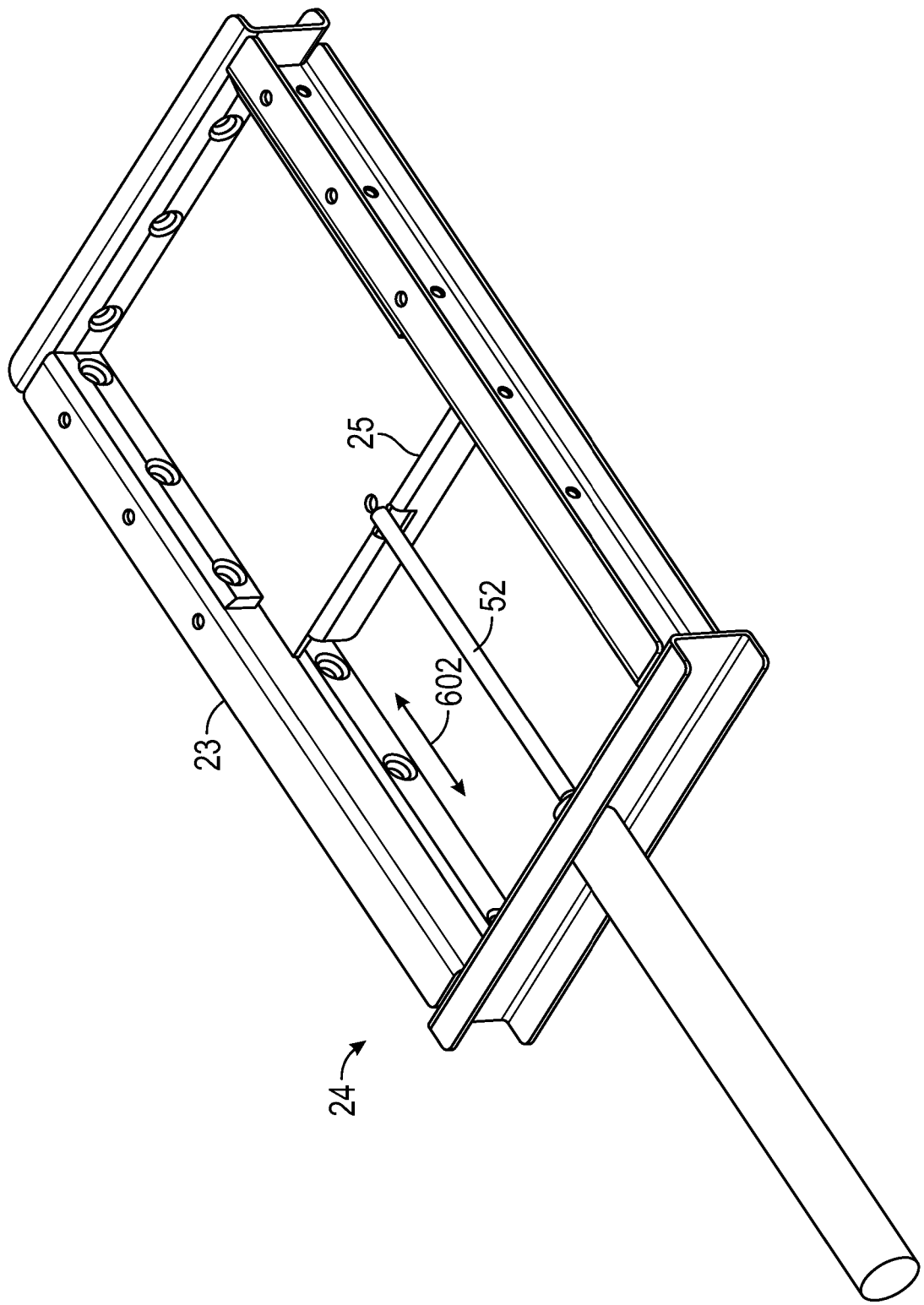
FIG. 6 shows a perspective view of a variable position gate used in a seed metering and discharge system.

Referring to FIG. 6, there is shown a perspective view of a variable position gate 24 in accordance with one example as described above. The variable position gate 24 includes a frame 23 that is generally rectangular in which is disposed in a movable manner a slide gate 25. Frame 23 limits the movement of slide gate 25 to the generally planar configuration of the frame 23. Attached to one end of the slide gate 25 is the first control mechanism 50. In this example, a pneumatic cylinder having an extendible arm 52 coupled to slide gate 25 allows for movement of the slide gate 25 in the directions of arrow 602 for opening and closing the first discharge opening 22 of the weigh hopper 20 (not shown) to which the variable position gate 24 is mounted.

Referring now to continuous discharge cycle 700, a continuously flowing seed metering and discharge system is shown operating chronologically, as shown by arrows 702, 704, 706, 708, 710, in various periods of operation, as depicted by FIGS. 7A, 7B, 7C, 7D, 7E, 7F. The series of periods may be carried out by the system 100 during a continuous discharge cycle 700 to maintain a regulated continuous flow of metered seed. The supply hopper 40 receives and discharges a product flow intermittently throughout the continuous discharge cycle 700. After an initial loading period, the weigh hopper 20 continuously dispenses the product. Bulk material is discharged from the supply hopper 40 during the loading period and the refill period. Bulk material is discharged continuously from the weigh hopper 20 during the measurement period and the refill period.

The loading period 715 is depicted in FIG. 7A. In this period, bulk material is discharged from the supply hopper 40 to the weigh hopper 20. A seed source (not shown for the sake of simplicity) provides an input flow of agricultural seed 745 into the supply hopper 40. The seed source may be supplied by another hopper, a box stand, auger, bucket elevator, or input into the system 100 by a conveyor. The input flow of agricultural seed 745 is directed by the second tapered portion 41 to the second discharge opening 42 of the supply hopper 40. The input flow of agricultural seed 745 fills the weigh hopper 20 when the binary gate 44 of the supply hopper 40 is open. The variable position gate 24 may be closed during the loading period. The input flow of agricultural seed 745 is directed by the first tapered portion 21 to form a first quantity of bulk material 720. When the first quantity of bulk material 720 reaches a first high-level sensor 28 within the weigh hopper 20, the controller transitions the system 100 out of the loading period 715 and into the variable position mode, according to arrow 702.

A first measurement period 730 is depicted in FIG. 7B. During the first transition into the first measurement period 730, the controller commands the binary gate 44 closed by the second control mechanism 55. The controller begins adjusting the variable position gate by the first control mechanism 50 proportionally based on the gravimetric readings to achieve and maintain a selected flow rate during the first measurement period 730. In order to regulate seed flow rates based on real-time measurements, the controller 60 monitors the rate of change on the load cells 30, 32, 34, 36 as seed flows from the weigh hopper 20 during the continuous discharge cycle 700. The controller 60 compares the scale discharge rate calculations to the target seed flow rate and adjusts the slide gate 25 of the variable position gate 24 accordingly to provide the seed flow at the target seed flow rate. The controller 60 adjusts the first control mechanism 50 based on electrical signals that are proportional to the mass of the bulk material as read by the load cells to command the positioning of the variable position gate 24.

During the first measurement period 730, the first quantity of bulk material 720 flows through the first discharge opening 22 of the weigh hopper 20 as an output flow of agricultural seed 725. During this period, bulk material is discharged gravimetrically from the weigh hopper 20 based on the loss-in-weight measurements. Meanwhile, the input flow of agricultural seed 745 begins to form a second quantity of bulk material 740 within the supply hopper 40 when the binary gate 44 is closed. Bulk material is not discharged into the weigh hopper 20 from the supply hopper 40 during the first measurement period 730. Bulk material continues to discharge from the weigh hopper 20 to the seed receiving equipment (not shown for sake of simplicity) during the second transition, according to arrow 704 in FIG. 7C.

When the second quantity of bulk material 740 reaches a second high-level sensor 48 within the supply hopper 40, the controller transitions the system 100 out of the variable position mode and into the fixed position mode, according to arrow 706. Opening of the supply hopper 40 when the second high-level sensor 48 is triggered may allow for a volumetric measurement estimate of the second quantity of bulk material 740. During this second transition, the variable position gate is moved into a fixed position by the first control mechanism 50.

As the system 100 completes the transition into a first refill period 750, as shown in FIG. 7D, bulk material begins to discharge at a constant rate from the weigh hopper 20. The system 100 is engaged in the fixed position mode during this refill period. Bulk material continues to discharge from the supply hopper 40 into the weigh hopper 20 while bulk material discharges from the weigh hopper 20 to the seed receiving equipment. Bulk material may continue to discharge from the seed transfer equipment to the supply hopper 40 during the first refill period 750, as shown in FIG. 7D. Alternatively, bulk material may cease to discharge from the seed transfer equipment to the supply hopper 40 during the first refill period 750, as shown in FIG. 7E. The discharge from the seed transfer equipment may depend on a signal from a second high-level sensor 48 in the supply hopper 40. When the first quantity of bulk material 720 reaches the first high-level sensor 28 or the second quantity of bulk material 740 reaches the second low-level sensor 46 within the supply hopper 40, the controller converts the system 100 out of the fixed position mode and back into the variable position mode, according to arrow 710. During this transition, the controller commands the second control mechanism 55 to close the binary gate 44. The variable position gate returns to being proportionally adjusted by the first control mechanism 50 based on the controller receiving real-time gravimetric readings.

A second measurement period 770 is depicted in FIG. 7F. During the second measurement period, a third quantity of bulk material 760 flows through the first discharge opening 22 of the weigh hopper 20 as the output flow of agricultural seed 725 continues. The third quantity of bulk material is discharged gravimetrically from the weigh hopper 20 based on the loss-in-weight measurements. Meanwhile, the input flow of agricultural seed 745 may begin to form a fourth quantity of bulk material 780 within the supply hopper 40 when the binary gate 44 is closed. Alternatively, the input flow of agricultural seed 745 may be stopped and a discharge period started. In the discharge period, a last quantity of bulk material may flow through the first discharge opening 22 with the program in the variable position mode. The discharge period continues until the output flow of agricultural seed 745 discharges the last quantity of bulk material from the weigh hopper 20 into the seed receiving equipment (not shown for sake of simplicity).

Figure 8A:
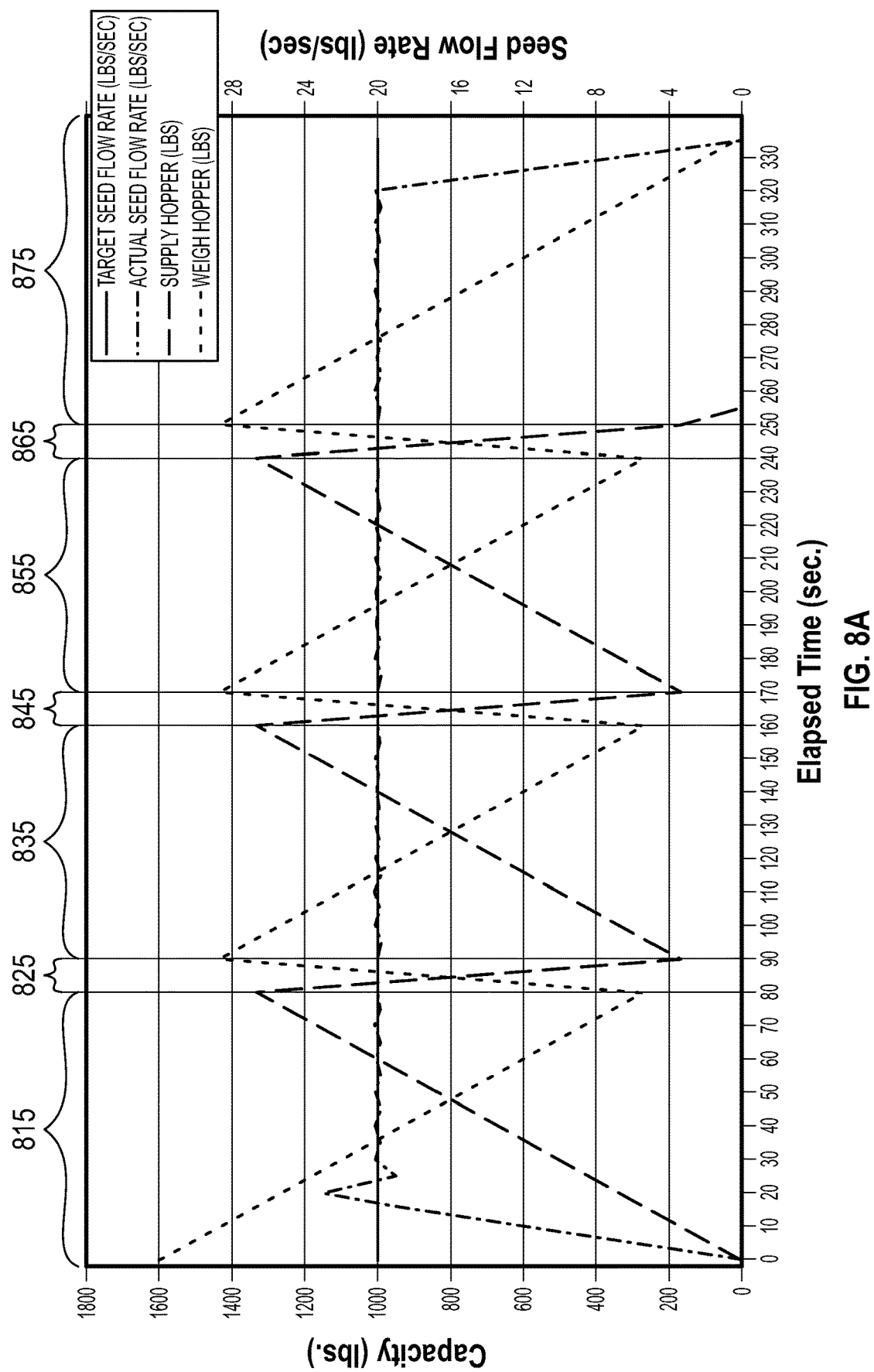
FIG. 8A shows a graphic performance estimation of a seed metering and discharge system.

Referring now to FIG. 8A, a graphic estimation of a target seed flow rate, an actual seed flow rate, and hopper capacities of the system are shown. This figure shows that the actual seed flow rate may closely follow the target seed flow rate. The actual seed flow rate is not distinguished by either the measured seed flow rate or the assumed seed flow rate. The actual seed flow rate is determined based on regulation of the seed flow rate at the output end of the system 100. Alternating iteratively between the variable position mode during a measurement period and the fixed position mode during a refill period allows for continuous discharge of the agricultural seed from the weigh hopper 20 during a continuous discharge cycle 700 as previously discussed. The weigh hopper 20 is allowed to continuously discharge until the program determines that the continuous discharge cycle has been completed and a quantity of seed through the system 100 runs out. Quantities of bulk material may be discharged continuously in multiple periods until a delivered seed amount is discharged. Multiple periods may cycle in an iterative manner until the quantity of seed through the system 100 runs out.

For example, as shown in FIG. 8A, the weigh hopper 20 continuously discharges a first quantity of bulk material during a first measurement period 815, which may occur after a loading period. Simultaneously, the supply hopper 40 is filled with a second quantity of bulk material. The actual seed flow rate begins to correlate with the target seed flow rate as the variable position gate 24 proportionately adjusts based on the real-time readings from the load cells supporting the weigh hopper 20. At the end of the first measurement period 815, the fixed position mode may be activated when a low-level sensor of the weigh hopper 20 signals that the first quantity of bulk material has reached a low-level within the weigh hopper 20. As one alternative, load cells supporting the weigh hopper 20 may signal a low-weight set point has been reached so that the program initiates the fixed position mode. As another alternative, the supply hopper 40 may have a high-level sensor that signals the program to initiate the fixed position mode. The second quantity of bulk material is discharged from the supply hopper 40 into the weigh hopper 20 during a first refill period 825. At the start of the refill period 825, the variable position gate 24 may be moved into a fixed position.

Iterative periods of the continuous discharge cycle may follow, including a second measurement period 835, a second refill period 845, a third measurement period 855, a third refill period 865, and so on, until a delivered seed amount is discharged. A discharge period 875 ends the continuous discharge cycle as shown in FIG. 8A. The discharge period 875 may occur when the input flow of bulk material into the supply hopper 40 stops and the output flow of bulk material discharges the remaining quantity of bulk material from the weigh hopper 20. The system 100 may turn off as soon as a delivered seed amount is discharged thereby completing the continuous discharge cycle 700. The system 100 may automatically turn back on as soon as the supply hopper 40 is available to refill the weigh hopper 20 again.

Figure 8B:
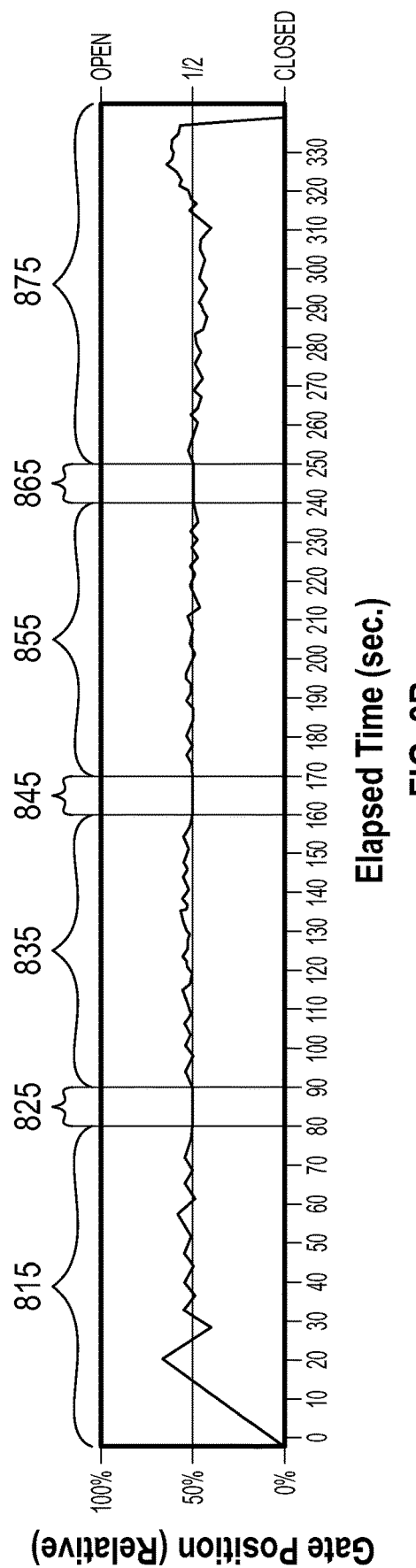
FIG. 8B shows a graphic estimation of the gate position during the continuous discharge cycle.

Referring now to FIG. 8B in comparison to the graphic estimation shown in FIG. 8A, the slide gate 25 is variably adjusted during the measurement periods and discharge period previously discussed. The slide gate 25 of the variable position gate 24 moves into a plurality of positions, between fully opened and fully closed, so that the actual seed flow rate may closely match the target seed flow rate as shown in FIG. 8A. Adjustment of the slide gate 25 into the plurality of positions maintains a measured seed flow rate of the agricultural seed near the target seed flow rate. The measured seed flow rate is defined as a quantity of seed that flows through the first discharge opening 22 over time during the measurement period. The measured seed flow rate may be based on loss-in-weight measurements measured in real-time by the load cells.

The slide gate 25 of the variable position gate 24 is in a fixed position during the refill periods previously discussed and shown in FIG. 8A. Fixing the position of the slide gate 25 into a static position maintains an assumed seed flow rate of the agricultural seed near the target seed flow rate. The assumed seed flow rate is defined as a quantity of seed that flows through the first discharge opening 22 over time during the refill period. The assumed seed flow rate may be based on loss-in-weight measurements previously measured during the measurement period.

During the measurement period, the controller may place the system 100 back into the variable position mode. Partially opening and closing the variable position gate 24 effects the measured seed flow rate when matching to the target seed flow rate that is predetermined. In turn, a seed treatment flow rate that is downstream may closely follow the actual seed flow rate.

Accuracy in the positioning of the slide gate 25 of the variable position gate 24 may be increased when using the system 100. "Drift" in the actual seed flow rate away from the target seed flow rate may be tightened and improved over an individual continuous discharge cycle and subsequent continuous discharge cycles. Manual calibration checks and adjustments, that would otherwise be necessary at regular intervals of the seed metering and discharge process, may be reduced or eliminated when using the system 100. Therefore, an operator does not routinely recalibrate to ensure the correct seed quantity or number of seed units (number of seed bags) are being discharged from the system 100. This may reduce operator induced errors that would otherwise be keyed into the system 100 during calibration adjustments.

An average flow rate may be calculated based on assumed seed flow rates and measured seed flow rates of the agricultural seed discharged from the weigh hopper 20. The system 100 may be configured to calculate an estimated delivered seed amount. The system 100 is not limited to two hoppers but may use any number of hoppers, stacked vertically, horizontally, or a combination of vertically and horizontally stacked hoppers, to meter the flow of any type of bulk material efficiently and accurately.

The controller 60 may control the system 100 in accordance with the target seed flow rate input provided by a system operator. The operator may change the target seed flow rate entered in the controller 60 based on the input flow rate of material into the supply hopper 40. Alternatively, the controller 60 may adjust the target seed flow rate based on an increase or decrease of the refill rate from the supply hopper 40. The refill rate from the supply hopper 40 may be calculated from the holding capacity of the supply hopper 40 and a time interval passed where a top surface of a quantity of agricultural seed displaces between a second low- and high-level sensor 46, 48, respectively, mounted within the supply hopper 40. The target seed flow rate may be based on a pre-calculation(s) or post-calculation(s) taken from a previous continuous discharge cycle. The target seed flow rate may also be determined based on a downstream treatment applicator having a target treatment flow rate. The controller 60 may also be used to monitor and control the flow of treatment chemicals applied to the seed downstream from where the seed is discharged from the weigh hopper 20. As such, the weigh hopper 20 is preferably situated below the supply hopper 40 at the head of the seed treatment system to dispense into the applicator under force of gravity.

As previously mentioned, the controller 60 may have a touch screen in which the operator inputs various system operating parameters such as seed source, seed size, treatment application ratio (oz./cwt) and the target seed flow rate (lbs/min) of the discharge. The controller 60 may coordinate the seed metering and discharge system with the seed treatment system by driving the seed treatment flow rate with the seed discharge from the weigh hopper 20. The controller 60 may monitor the seed treatment flow rate set into the treatment system. The touch screen may display for the operator the seed treatment flow rate with the seed flow rates as they occur. The controller 60 may coordinate and adjust the seed treatment flow rate and the variable gate position to respond to changes in seed flow. Factors that could cause changes to the seed flow rates may include build-up in the hopper discharge opening, differences in seed flow characteristics, varying seed amounts, etc.

Seed discharge rates obtained during the measurement and refill periods may be used to proportion treatment application of various chemicals to the seed in a downstream treatment system. The seed treatment system may apply seed treatment to seed delivered from the system 100. The seed treatment may be delivered by an applicator at a seed treatment flow rate in accordance with the measured seed flow rate and the assumed seed flow rate from the weigh hopper 20. Seed treatment pumps may be driven in proportional adjustment with the actual loss-in-weight readings of the weigh hopper 20.

The system 100 may be used in collaboration with a control software platform or program that serves as a measuring and control device for the seed treatment apparatus. One such example used in seed treatment is KSi® AutoTreat®. The control software platform controls the liquid treatment rate of the auto treater based on a recipe input (i.e., oz./per 100 lbs. of seed) and the measured seed flow rate from the system 100. As a measuring and control device, the control software platform may control the variable position gate 24 concurrently with the speed of the seed treatment pumps to match the target seed flow rate. The controller 60 may be installed with the program to have multi-functionality capabilities to receive both a seed discharge request order and seed treatment parameters from the operator.

The controller 60 that is programmed may switch automatically between a fixed position mode and a variable position mode. The program in the controller 60 may initiate system actions based on a set point being met such as a hopper discharge rate, a hopper high/low weight indicator, a discharge time interval as entered by an operator, or a high/low sensor signal. In one example, the program may calculate the measured seed flow rate based upon the rate of change of the weight of the weigh hopper 20 and the seed content contained as measured by the load cells 30, 32, 34, 36. After calculating the measured seed flow rate, the program may determine the measured seed flow rate is greater than or less than the target seed flow rate. If it is determined that the measured seed flow rate is greater than the target seed flow rate, the program changes the position of the variable position gate 24 thereby decreasing the actual seed flow rate which reduces the measured seed flow rate. If it is determined that the measured seed flow rate is less than the target seed flow rate, the program changes the position of the variable position gate 24 thereby increasing the actual seed flow rate which increases the measured seed flow rate. This cycle continues until the program determines that the weigh hopper 20 is nearing empty or the supply hopper 40 is nearing full capacity.

If a request for seed metering is entered in the controller 60 by an operator, the program may use the entered parameters to set the target seed flow rate. Upon receipt of a start command, the supply hopper 40 starts discharging seed into the weigh hopper 20. Upon determination by the controller 60 that the supply hopper has discharged a selected amount of seed, the program closes the binary gate 44 of the supply hopper 40 to a closed position. Proportional adjustment of the variable position gate 24 is based on the loss-in-weight measurement as the new batch of seeds is continuously discharged. Optionally, the variable position gate 24 of the weigh hopper 20 may be closed at a loading period, as shown in FIG. 7A. The program in controller 60 confirms that seed discharge is nearing empty in the supply hopper 40 and may command refilling of the supply hopper 40 from the seed source.

If the controller 60 determines that the requested mode of operation will switch to the fixed position mode, the program may calculate the fixed position for the variable position gate 24 based upon the real-time operating parameters in which the variable position gate 24 operated in the variable position mode during the previous measurement period. The controller 60 may open the binary gate 44 of the supply hopper 40 and allow for the discharge of seed from the supply hopper 40 until nearly empty. The controller 60 may then close the binary gate 44 for the supply hopper 40 to be refilled. The weigh hopper 20 is allowed to continuously discharge until the program determines that a continuous discharge cycle 700 or multiple cycles have been completed. Metering and discharge steps may also cycle in an iterative manner until the quantity of seed through the system 100 runs out. Alternatively, an operator/outside control trigger may shut off the system 100.

Following termination of discharge of seed from the weigh hopper 20 in the system 100, the program may confirm that the full amount of requested seed has been discharged based on the calculated rate over time. If it is determined that the total amount of seed discharged through the weigh hopper 20 is not complete, the program recalculates the discharge set points for additional discharge based upon the discharge mode parameters entered by the operator or last calculated during the measurement period. Once it is determined that the full amount of seed has been discharged through the weigh hopper 20, the program ends the continuous discharge cycle 700 and input of seed from the seed source.

Switching between modes may be initiated and dependent upon reaching established set points. The program may have calculated set points based on hopper weight and start/stop commands for each of the hopper gates involved in the seed metering and discharge operation. More specifically, set points may be established on timer settings based on calculated intervals of time, readings obtained from an upstream or downstream hopper scale, high/low weight readings from load cells, indications by high/low level sensors (proximity) having a fixed position within the hoppers, or another predetermined parameter. The bulk density of the seed may be used to calibrate the set points based on weight. An operator may also adjust established set points such as weight limits, discharge positions of the variable position gate 24, or time intervals in the controller 60 as needed.

The operational switch between the fixed position mode and the variable position mode may not happen instantaneously. Rather, the controller 60 may close/open the binary gate 44 and position the variable position gate 24 proportionally or in a fixed position over an interval of time. The transition time between modes may occur over a period such as a few seconds. Alternatively, time-off and time-on delays may be programmed into the controller to establish a transition phase between modes. This may allow the loss-in-weight readings by the load cells to "catch up" since readings for differences in weight may be taken sequentially, such as ten times each second. Calculations based on an average of the last ten seconds logged by the load cells may allow for transition to occur over an interval of time between three to five seconds.

The refill period may be triggered by the controller 60 once a refill set point has been met, such as when a low-level sensor sends a signal to the controller 60 when a quantity of seed reaches a low level within the weigh hopper 20. At the beginning of the refill period, the controller 60 will switch from gravimetric metering of seed from the weigh hopper 20 to a fixed rate of discharge. For example, the variable position gate 24 may be held in a fixed position while the system 100 is in the fixed position mode. The fixed position of the variable position gate 24 may be set moments before the binary gate 44 is opened, which is before the refill period is initiated by the controller 60.

In another example, a load cell may send a refill signal to the controller 60 when the quantity of seed within the weigh hopper 20 reaches a low weight set point. In the case of a hopper having a holding capacity of 7,500 lbs. (approx. 3,402 kg), the low weight set point may be based on a load cell reading of 250 lbs. (less the weight of the hopper). Once the load cell has reached a low-level weight set point or the low-level sensor no longer senses seed in the weigh hopper 20, the variable position mode will turn off and the system 100 will begin to transition into the fixed position mode. In the fixed position mode, the weigh hopper 20 will continue to discharge seed at an assumed seed flow rate until the refill period is complete.

In another example, a load cell may send the filled signal to the controller 60 when the quantity of seed within the weigh hopper 20 reaches a high weight set point. The high weight set point may be based on a load cell reading of 7,250 lb. (approx. 3,289 kg). Alternatively, low/high-level proximity sensors may be used in combination with, or in replacement of the set points based on time or weight. In one example, a load cell may send a signal to the controller 60 that a low-level weight set point, such as 1% of the total fill weight, has been met by the weigh hopper 20. The controller 60 then concurrently opens the binary gate 44 of the supply hopper 40 and initiates the fixed position mode for a 30-second refill period.

During the refill period, the supply hopper 40 dispenses a quantity of product into the weigh hopper 20. A timer operably connected to the controller 60 may send a signal to the controller 60 when the interval of 30 seconds has elapsed for the refill period. Upon the set point of 30 seconds being reached, the controller 60 concurrently closes the binary gate 44 of the supply hopper and initiates the variable position mode for the measurement period. The closed binary gate 44 prevents seed from passing through the second discharge opening 42 of the supply hopper 40.

The filled set point may be based on a number of parameters such as a high-level mark on the weigh hopper 20, a low-level mark on the supply hopper 40, an interval of time, a minimum weight measurement of the supply hopper 40, or a maximum weight measurement of the weigh hopper 20. For example, the controller 60 may switch back to the variable position mode after 10 seconds of time has passed. The variable position mode may be initiated for a 70 second interval of time where the weigh hopper 20 discharges seed at a measured seed flow rate to match the target seed flow rate of 1,000 lbs./min (approx. 454 kg/min). The measured seed flow rate may be calibrated based on the positioning of the variable position gate 24 in this case.

The supply hopper 40 may be filled with transfer equipment, such as a conveyor, connected with the seed source. The conveyor may be disposed above or operably connected to the supply hopper 40 of the system 100, although the conveyor is not shown in the figures for simplicity. The conveyor may fill the supply hopper 40 with a continuous or intermittent stream of seed from a seed source. Seed may be dispensed by the conveyor while the system 100 continues to dispense product from the weigh hopper 20. The conveyor will shut down once the supply hopper 40 has been filled up to the target draft weight, a high-level sensor, or other set point. Alternatively, a timer may send a signal to the controller 60 when an interval of 120 seconds has elapsed for measurement period. Upon the set point of 120 seconds being reached, the controller 60 concurrently reopens the binary gate 44 and reinitiates the fixed position mode for a second refill period. Alternatively, the system 100 may be backed up to a bin or silo to receive the seed amount.

In one example, the weigh and supply hoppers 20, 40, respectively, may have a holding capacity of 1,700 lbs. (approx. 32 units of seed). Initially, the weigh hopper 20 filled may discharge seed at a measured seed flow rate, metered gravimetrically, to match a target seed flow rate of 1,000 lbs./min (60,000 lbs./hr.). The target seed flow rate may be smaller or larger depending on the size of the seed metering and treatment systems. For larger capacity hoppers of up to 30,000 lbs. (approx. 13,608 kg) a target seed flow rate of 3,000 lbs./min (1,361 kg/min) may be selected. For smaller capacity hoppers down to 150 lbs. (68 kg) a target seed flow rate of 100 lbs./min (45 kg/min) may be selected. It should be noted that the target seed flow rate may automatically and continuously adjust based on the input flow rate of the seed into the supply hopper 40. The measured seed flow rate from the weigh hopper 20 may be continuously adjusted to the target seed flow rate by opening and closing the variable position gate 24 in real-time. Adjustments to the position of the variable position gate 24 may occur in real-time or sequentially as signals from the load cells are sent to the controller 60. Adjustments may be made in little as one to three milliseconds of time.

In another example, approximately 30 units of product may be delivered at a time through the system each minute. In the case of agricultural corn seed, a unit is approximately equal to 50 lbs. (approx. 23 kg) of weight in product. During a refill period, the variable position gate 24 may be fixed for seed to be discharged at an assumed seed flow rate that is fixed or constant. The refill period may last approximately ten seconds where approximately 25 units of product are dispensed from the supply hopper 40 with 5 units of product remaining in the weigh hopper 20. The measurement period may last approximately 50 seconds where zero units of product are dispensed from the supply hopper 40 being refilled, while the 25 units of product are being dispensed from the weigh hopper 20. During the measurement period, the variable position gate 24 may be proportionally adjusted to a position, in real-time, for gravimetric metering of the dispensed product. During the measurement period, where product is dispensed gravimetrically, the system may account and adjust for incremental changes in the product flow rate due to variables such as temperature, humidity, blockage, flow air pockets/cavities, product density variations, etc. Data obtained from regular and/or longer measurement periods may provide increased efficiency in establishing calibration parameters for the refill period. Calibration parameters may be adjusted automatically by the system 100.

The above-described processes may be software in the form of one or more software modules. Software modules may be executable code in various forms, including: executable application, an Application Programming Interface (API), a subroutine, a function, a procedure, an applet, a servlet, a routine, source code, object code, a shared library/dynamic load library or one or more instructions. Software modules may be stored in any type of suitable non-transitory or transitory storage medium (e.g., electrical, optical, acoustical or other form of propagated signals, such as carrier waves, infrared signals, or digital signals)

As mentioned above, the controller could be a programmable automation controller that receives inputs and controls outputs throughout a sequence of a continuous discharge cycle. The controller could be a server, desktop computer, laptop computer, tablet device, smart phone, handheld computer, or any other wired or wireless, processor-driven device. A computer or microprocessor may be programmed to run the above listed instructions, carrying out the above-described algorithms.

Instructions for the methods and processes described may be embedded in at least one non-transitory computer-readable storage medium. These instructions may be executed by at least one computer. The at least one computer performs the methods discussed above. The term "non-transitory", as used herein, is a limitation of the medium itself (i.e., tangible hardware, not a signal) as opposed to a limitation on data storage persistency (e.g., RAM vs. ROM).

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

We claim:

1. An automated method for generating a continuous seed flow comprising the steps of:
   adjusting a commanded position of a variable position gate of a weigh hopper during a measurement period where the weigh hopper is dispensing seed and not being refilled;
   fixing a position of the variable position gate during a refill period where the weigh hopper dispenses the seed and is refilled; and
   discharging a continuous stream of seed from the weigh hopper during the measurement period and the refill period.

2. The method of claim 1, wherein the previous steps are performed in an iterative manner until a delivered seed amount equals an ordered seed amount.

3. The method of claim 1, further comprising the step of:
   adjusting the commanded position based on gravimetric metering of the weigh hopper in real-time.

4. The method of claim 1, further comprising the step of:
   delivering the continuous stream of seed from the weigh hopper, during the refill period, at a target seed flow rate.

5. The method of claim 1, further comprising the step of:
   beginning the refill period upon receipt of a low-level signal generated by a low-level sensor disposed within the weigh hopper.

6. The method of claim 1, further comprising the steps of:
   opening a second gate of a supply hopper, disposed above the weigh hopper, upon receipt of a start command for the refill period; and
   closing the second gate upon receipt of a high-level signal generated by a high-level sensor disposed within the weigh hopper.

7. The method of claim 6, further comprising the step of:
   filling the supply hopper with a quantity of seed from a seed source during the measurement period until a high-level signal from a high-level sensor in the supply hopper is received.

8. The method of claim 6, further comprising:
   switching operations to a variable position mode when the second gate closes.

9. The method of claim 1, further comprising the step of:
   calculating a delivered seed amount based on a sum of:
   a measured seed flow rate over the measurement period; and
   an assumed seed flow rate over the refill period.

10. The method of claim 1, further comprising the step of:
    matching a treatment flow rate of a seed treatment apparatus to an actual seed flow rate of the continuous seed flow.

11. The method of claim 1, further comprising:
    transferring, intermittently, a quantity of seed from a supply hopper to the weigh hopper.

12. The method of claim 11, wherein the weigh hopper and the supply hopper are each configured to support a seed amount weighing up to 30,000 pounds.

13. A method comprising:
    discharging a continuous stream of seed from a gate of a weigh hopper over a measurement period during which the weigh hopper is not being refilled and a refill period during which the weigh hopper is being refilled;
    adjusting a position of the gate with a controller during the measurement period; and
    fixing the position of the gate with the controller during the refill period.

14. The method of claim 13, wherein the position of the gate is adjusted during the measurement period based on real-time weight measurements of the weigh hopper.

15. The method of claim 13, further comprising repeatedly alternating between the measurement period and the refill period.

16. The method of claim 13, wherein seed is discharged continuously from the weigh hopper at a target seed flow rate and the position of the gate is adjusted with the controller to maintain the target seed flow rate during the measurement period.

17. A method of discharging a continuous stream of seed from a weigh hopper comprising:
    discharging seed from a gate of the weigh hopper during a first time period where the weigh hopper is not being refilled, wherein discharging the seed during the first time period includes adjusting a position of the gate with a controller;
    discharging seed from the gate of the weigh hopper during a second time period where the weigh hopper is being refilled, wherein discharging the seed during the second time period includes fixing the position of the gate with the controller; and
    discharging the continuous stream of seed over the first time period and the second time period.

18. The method of claim 17, further comprising:
    determining that an amount of seed in the weigh hopper has dropped to a refill set point; and
    moving the position of the gate to a fixed position and refilling the weigh hopper based at least in part on the determination that the amount of seed in the weigh hopper has dropped to the refill set point.

19. The method of claim 17, further comprising:
    computing with the controller that an amount of seed in the weigh hopper has dropped to a refill set point; and
    using the controller to move the position of the gate to a fixed position and refill the weigh hopper based at least in part on computing with the controller that the amount of seed in the weigh hopper has dropped to the refill set point.

20. The method of claim 17, wherein the position of the gate is adjusted during the first time period based on real-time weight measurements of the weigh hopper.

* * * * *